United States Patent
Song et al.

(10) Patent No.: US 9,392,146 B2
(45) Date of Patent: Jul. 12, 2016

(54) APPARATUS AND METHOD FOR EXTRACTING OBJECT

(71) Applicant: Hanwha Techwin Co., Ltd., Changwon-Si (KR)

(72) Inventors: Moo-Kyung Song, Changwon (KR); Soon-min Bae, Changwon (KR)

(73) Assignee: Hanwha Techwin Co., Ltd., Changwon (KR)

( * ) Notice: Subject to any disclaimer, the term of this patent is extended or adjusted under 35 U.S.C. 154(b) by 81 days.

(21) Appl. No.: 13/860,080

(22) Filed: Apr. 10, 2013

(65) Prior Publication Data

US 2014/0055644 A1 Feb. 27, 2014

(30) Foreign Application Priority Data

Aug. 24, 2012 (KR) ......................... 10-2012-0093030

(51) Int. Cl.
*H04N 5/225* (2006.01)
*G06K 9/62* (2006.01)
*G06K 9/46* (2006.01)
*H04N 5/232* (2006.01)

(52) U.S. Cl.
CPC .............. *H04N 5/225* (2013.01); *G06K 9/4642* (2013.01); *G06K 9/6203* (2013.01); *H04N 5/23229* (2013.01)

(58) Field of Classification Search
None
See application file for complete search history.

(56) References Cited

U.S. PATENT DOCUMENTS

| 8,090,147 | B2 | 1/2012 | Sano et al. | |
|---|---|---|---|---|
| 8,223,218 | B2* | 7/2012 | Inoue | 348/222.1 |
| 2003/0133613 | A1* | 7/2003 | Ono | 382/209 |
| 2006/0028552 | A1* | 2/2006 | Aggarwal et al. | 348/169 |
| 2007/0263924 | A1* | 11/2007 | Kochi et al. | 382/154 |
| 2009/0231458 | A1* | 9/2009 | Moriyama | 348/222.1 |
| 2010/0097443 | A1* | 4/2010 | Lablans | 348/36 |
| 2010/0165113 | A1* | 7/2010 | Abe | 348/169 |

FOREIGN PATENT DOCUMENTS

| JP | 4322913 B2 | 9/2009 |
|---|---|---|
| JP | 4819866 B2 | 11/2011 |
| KR | 10-0979726 B1 | 9/2010 |
| KR | 10-0999206 B1 | 12/2010 |
| KR | 10-1107736 B1 | 1/2012 |
| KR | 10-1131580 B1 | 3/2012 |
| WO | 2006/115427 A1 | 11/2006 |

* cited by examiner

*Primary Examiner* — Albert Cutler
(74) *Attorney, Agent, or Firm* — Sughrue Mion, PLLC

(57) ABSTRACT

An apparatus and method for quickly and accurately extracting an object in an image, the method including: performing at least one resizing on an extraction model pattern for of the object to be extracted; scanning an image frame, captured by a camera, using each of the at least one resized extraction model pattern, and extracting the object that is matched with any one of the at least one resized extraction model pattern; and displaying information about a position of the extracted object.

18 Claims, 10 Drawing Sheets

PERSON

BOTTLE

CAT

CAR

REDUCTION RESIZING

MAGNIFICATION RESIZING

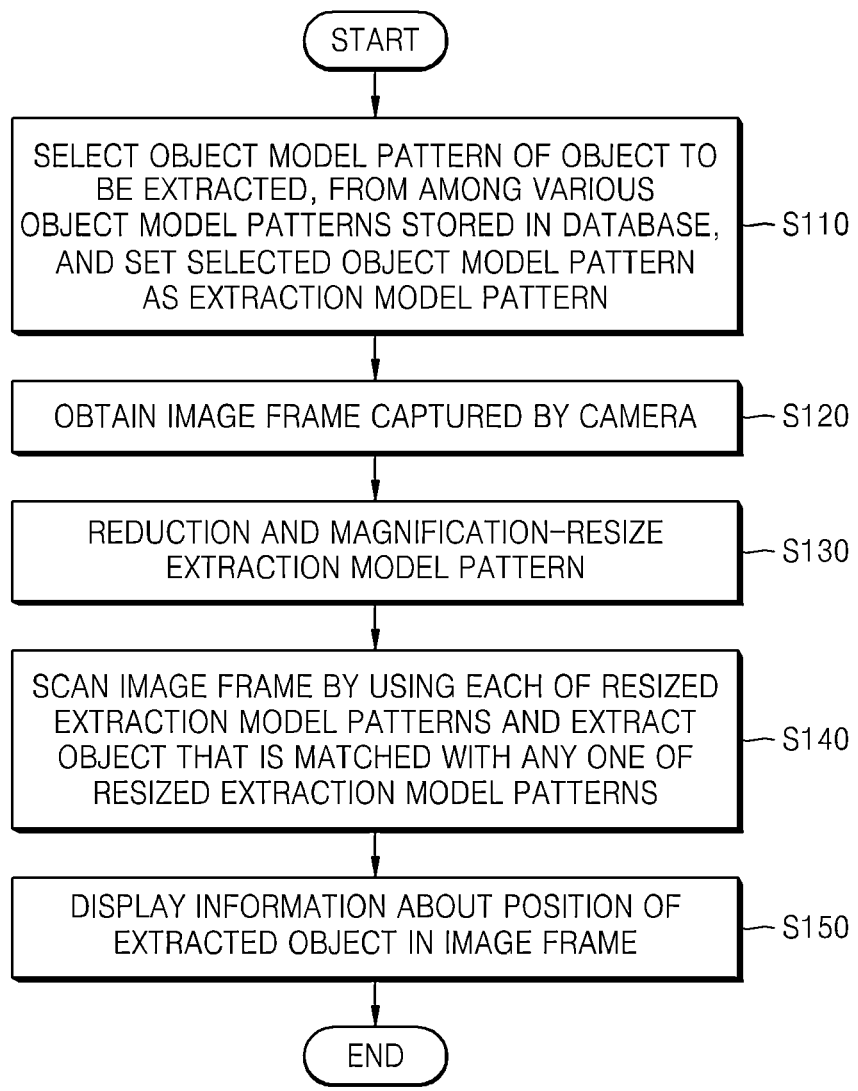

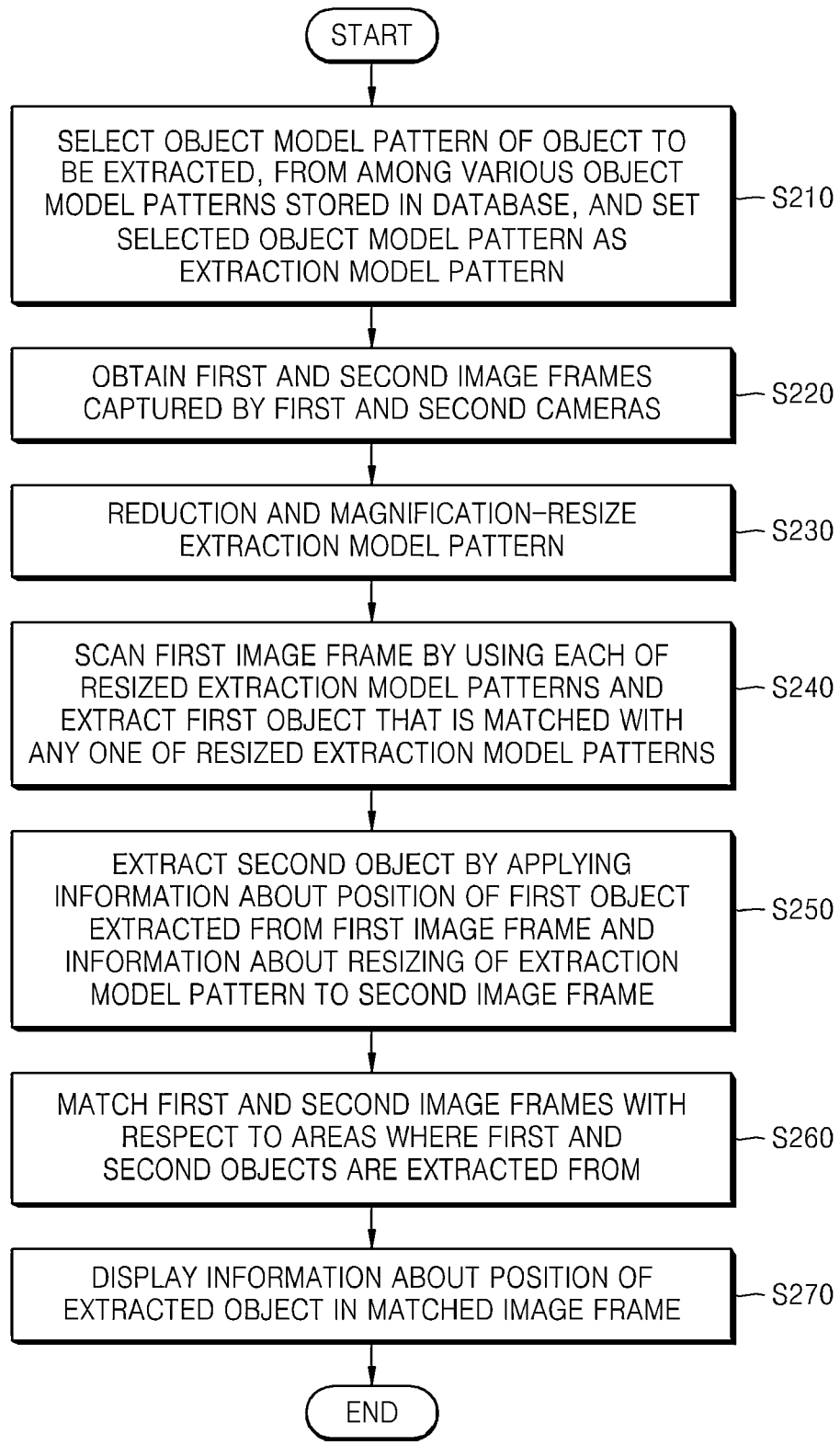

APPARATUS AND METHOD FOR EXTRACTING OBJECT

CROSS-REFERENCE TO RELATED PATENT APPLICATIONS

This application claims priority from Korean Patent Application No. 10-2012-0093030, filed on Aug. 24, 2012, in the Korean Intellectual Property Office, the disclosure of which is incorporated herein in its entirety by reference.

BACKGROUND

1. Field

Exemplary embodiments relate to an apparatus and method for quickly and accurately extracting an object in an image.

2. Description of the Related Art

A related art technology may extract and track an object, such as a person or a vehicle. This related art technology has become an important technology in image analysis research and surveillance/vigilance areas. This related art technology may be used to find out a person who committed a crime or a vehicle that violated traffic regulations, by installing a camera in a certain area. Further, the related art technology may be used to avoid obstacles or to detect and track an intruder by installing a camera on a moving equipment.

In a related art object extracting method, a model pattern of an object to be extracted is set, the whole image is repeatedly resized to search for an object from the image, which is matched with the size of the set model pattern. Then, in the related art, a similar object is extracted by scanning a set model pattern in the resized image. However, in such an object extracting method, since the whole image should be resized, a calculation process is complicated and takes a lot of time.

SUMMARY

Exemplary embodiment may provide an apparatus for quickly and accurately extracting an object by resizing a model pattern of an object to be extracted and scanning the resized model pattern in a captured image.

Exemplary embodiment may also provide a method of quickly and accurately extracting an object by resizing a model pattern of an object to be extracted and scanning the resized model pattern in a captured image.

According to an aspect of the exemplary embodiments, there is provided a method of extracting an object, the method including: performing at least one resizing on an extraction model pattern for the object to be extracted; scanning an image frame, captured by a camera, using each of the at least one resized extraction model pattern, and extracting the object that is matched with any one of the at least one resized extraction model pattern; and displaying information about a position of the extracted object.

The method may further include selecting an object model pattern of the object to be extracted, from among various object model patterns stored in a database, and setting the selected object model pattern as the extraction model pattern.

The performing the at least one resizing may include performing at least one reduction and magnification resizing on the extraction model pattern.

The performing the at least one resizing may include performing a forward mapping in which coordinates of an image of the extraction model pattern are mapped to coordinates of an image to be resized.

The method may further include transferring the information about the position of the extracted object and information about the at least one resizing of the extraction model pattern, which is matched with the object, to a next image frame.

The method may further include: performing at least one resizing on the various object model patterns stored in the database; and storing results obtained by performing the at least one resizing in the database.

The extracting the object may include scanning the image frame using each of the at least one resized extraction model pattern stored in the database, and extracting the object that is matched with any one of the at least one resized extraction model pattern.

Obtaining the image frame may include: obtaining a first image frame captured by a first camera; and obtaining a second image frame captured by a second camera.

The performing the at least one resizing may include performing at least one resizing on an extraction model pattern for the object to be extracted in a first image frame.

The extracting the object may include: scanning the first image frame using each of the at least one resized extraction model pattern, and extracting a first object that is matched with any one of the at least one resized extraction model pattern; and extracting a second object by applying the information about the position of the first object extracted from the first image frame and information about the at least one resizing of the extraction model pattern to the second image frame.

The method may further include matching the first and second image frames with respect to extracted areas of the first object and the second object.

The displaying the information about the position may include displaying the information about the position of the object in a matched image frame.

According to another aspect of the exemplary embodiments, there is provided an apparatus for extracting an object, including: a resizing device which performs at least one resizing on an extraction model pattern of the object to be extracted; an object extraction device which scans an image frame, captured by a camera, using each of the at least one resized extraction model pattern, and extracts the object which is matched with any one of the at least one resized extraction model pattern; and a display device which displays information about a position of the extracted object in the image frame.

The apparatus may further include a model setting device which selects an object model pattern of the object to be extracted, from among various object model patterns stored in a database, and sets the selected object model pattern as the extraction model pattern.

The resizing device may perform at least one reduction and magnification resizing on the extraction model pattern, and may perform a forward mapping in which coordinates of an image of the extraction model pattern are mapped to coordinates of an image to be resized.

The object extraction device may apply the information about the position of the extracted object and information about the at least one resizing on the extraction model pattern, which is matched with the object, to a next image frame.

According to another aspect of the exemplary embodiments, there is provided an apparatus for extracting an object, including: a first camera which obtains a first image frame; a second camera which obtains a second image frame; a model setting device which selects an object model pattern of the object to be extracted, from among various object model patterns stored in a database, and sets the selected object model pattern as the extraction model pattern; a resizing device which performs at least one resizing on the set extraction model pattern; an object extraction device which scans the first image frame using each of the at least one resized extraction model pattern, extracts a first object that is matched with any one of the at least one resized extraction model pattern, and extracts a second object by applying information about the position of the first object extracted from the first image frame and information about the at least one resizing of the extraction model pattern to the second image frame; a matching device which matches the first and second image frames with respect to extracted areas of the first object and the second object; and a display device which displays the information about a position of the object in a matched image frame.

The resizing device may perform at least one reduction and magnification resizing on the extraction model pattern and may perform a forward mapping in which coordinates of an image of the extraction model pattern are mapped to coordinates of an image to be resized.

The object extraction device may apply the information about the position of the extracted object and information about the at least one resizing on the extraction model pattern, which is matched with the object, to a next first image frame captured by the first camera.

According to another aspect of the exemplary embodiments, there is provided a computer readable recording medium having recorded thereon a program for executing a method of extracting an object, the method including: obtaining an image frame captured by a camera; performing at least one resizing on an extraction model pattern for extracting an object in the image frame; scanning the image frame using each of the at least one resized extraction model pattern, and extracting the object that is matched with any one of the at least one resized extraction model pattern; and displaying information about a position of the extracted object.

As described above, according to the exemplary embodiments, an object may be quickly and accurately extracted by resizing a model pattern of the object to be extracted and scanning the resized model pattern in a captured image.

BRIEF DESCRIPTION OF THE DRAWINGS

The above and other features and advantages of the exemplary embodiments will become more apparent by describing in detail exemplary embodiments thereof with reference to the attached drawings in which:

FIG. 9 is a flowchart illustrating a method of extracting an object, according to an embodiment; and FIG. 10 is a flowchart illustrating a method of extracting an object, according to another embodiment.

DETAILED DESCRIPTION OF THE EXEMPLARY EMBODIMENTS

Figure 1:
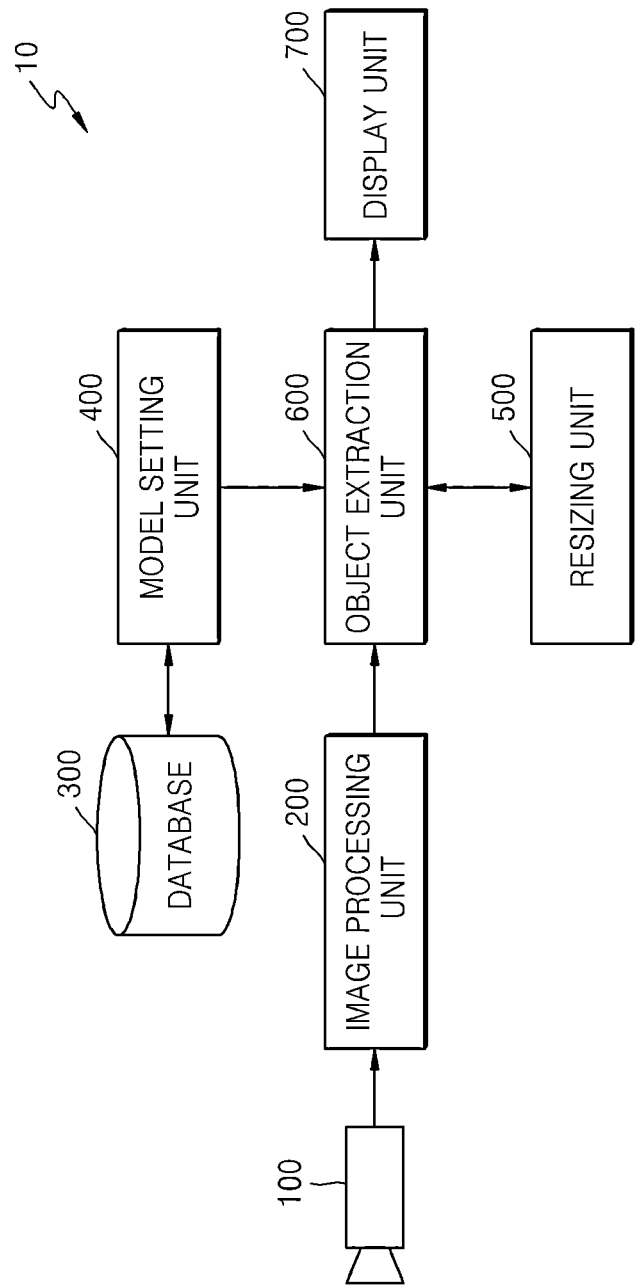
FIG. 1 is a block diagram schematically illustrating a structure of an object extracting apparatus according to an embodiment.

Hereinafter, the exemplary embodiments will be described in detail by explaining preferred embodiments of the exemplary embodiments with reference to the attached drawings. Like reference numerals in the drawings denote like elements and redundant descriptions thereof are omitted herein.

FIG. 1 is a block diagram schematically illustrating a structure of an object extracting apparatus 10 according to an embodiment.

Referring to FIG. 1, the object extracting apparatus 10 includes a camera 100, an image processing unit 200, a database 300, a model setting unit 400, a resizing unit 500, an object extraction unit 600, and a display unit 700.

The camera 100 captures an image of an object by using, e.g., a complementary metal-oxide semiconductor (CMOS) module or a charge coupled device (CCD) module. An input image frame is provided to the CMOS module or CCD module via lenses. The CMOS module or CCD module converts an optical signal, bouncing off the object and passing through the lenses, into an electric signal (a capturing signal), and outputs the electric signal to generate an image frame.

The image processing unit 200 reduces noise of the image frame output from the camera 100, and performs image signal processing for improving image quality, such as gamma correction, color filter array interpolation, color matrix, color correction, color enhancement, etc.

Also, the image processing unit 200 may generate an image file by compressing image data generated through the image signal processing for improving image quality, or may restore the image data from the image file. A compression format of an image may be a reversible format or an irreversible format.

Also, the image processing unit 200 may perform color processing, blur processing, sharpening processing, image analysis processing, image recognition processing, image effect processing, etc. The image recognition processing may include face recognition, scene recognition, etc. For example, the image processing unit 200 may perform brightness level adjustment, color correction, contrast adjustment, outline enhancement processing, screen division processing, character image generation, image synthesis processing, etc.

The database 300 stores various pieces of information about object model patterns. FIGS. 2A through 2D illustrate various types of object model patterns stored in the database 300. For example, various pieces of information about model patterns of objects (i.e., object model patterns) such as a person, a bottle, a cat, and a car are stored in the database 300. However, the object model patterns stored in the database 300 are not limited to the above examples, and a variety of types of object model patterns may be stored in the database 300.

The object model patterns are stored in the database 300 in the form of a histogram of gradient (HOG), indicating brightness distribution orientations to be used as a feature vector.

A HOG algorithm is one of various algorithms to extract a characteristic feature of an object. According to the HOG algorithm, an image is divided into a plurality of squared grids in a checkerboard pattern and a local histogram of distribution orientations of brightness is calculated in each square grid. In particular, a feature vector of the converted image is easily extracted, using a cell formed of a plurality of pixels and a block formed of a plurality of cells.

Figure 2A:
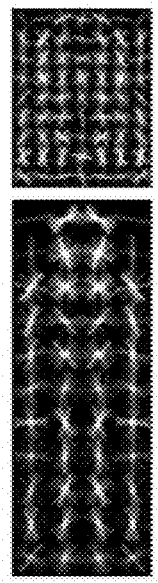
FIGS. 2A through 2D are diagrams illustrating various types of object model patterns stored in a database of FIG. 1.
Figure 2B:
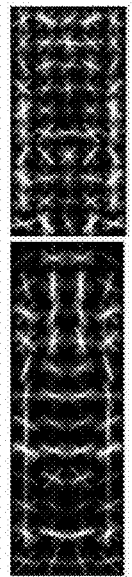
Figure 2C:
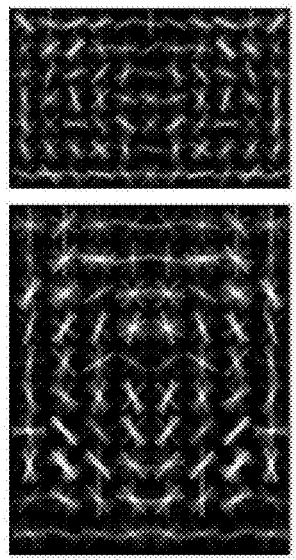
Figure 2D:
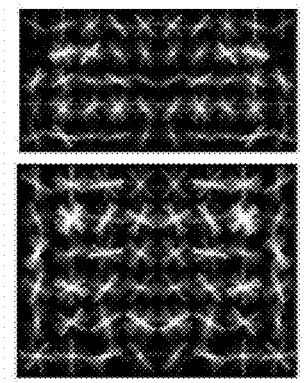

FIG. 2A illustrates a feature vector extracted by applying the HOG algorithm with respect to a person as an object model pattern. FIGS. 2B, 2C, and 2D illustrate feature vectors of a bottle, a cat, and a car, respectively.

Although in the present embodiment the HOG algorithm is used to extract the characteristic features of object model patterns, the exemplary embodiments are not limited, and a variety of methods, such as image normalization, self-quotient image (SQI), modified census transform (MCT), etc. may be used for extracting a characteristic feature of an object model pattern.

The model setting unit 400 selects an object to be extracted from among various objects stored in the database 300, and sets the selected object as an extraction model pattern. For example, the model setting unit 400 may set a car represented by the HOG as an extraction model pattern, according to a user's selection.

The resizing unit 500 performs at least one resizing on an extraction model pattern set in the model setting unit 400. In particular, the resizing unit 500 performs reduction resizing and magnification resizing on the set extraction model pattern.

Figure 3:
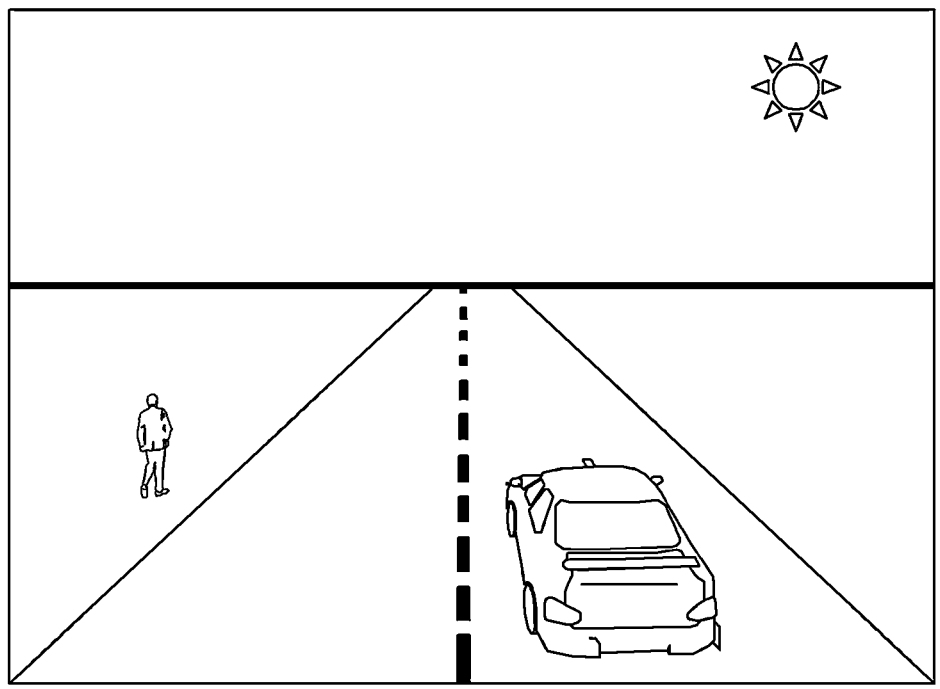
FIG. 3 is a diagram illustrating an example of an image frame captured by a camera of FIG. 1.

FIG. 3 illustrates an example of an image frame captured by the camera 100. FIGS. 4A through 4G illustrate reduction/magnification-resized results of an extraction model pattern (e.g., a car) set by the model setting unit 400. FIG. 5 is a diagram for explaining an image resizing using a forward mapping.

Figure 4A:
FIGS. 4A through 4G are diagrams illustrating reduction/magnification-resized results of an extraction model pattern set by a model setting unit of FIG. 1.
Figure 4B:
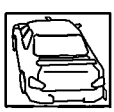
Figure 4C:
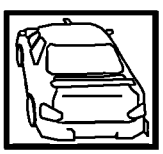

Referring to FIGS. 4A through 4G, when basis information about a car stored in the database 300 is given (as shown in FIG. 4C), the resizing unit 500 generates reduction extraction model patterns as shown in FIGS. 4A and 4B by performing reduction resizing based on the basis information of FIG. 4C, and generates magnification extraction model patterns as shown in FIGS. 4D through 4G by performing magnification resizing based on the basis information of FIG. 4C. Although in the exemplary embodiments, the reduction/magnification resizing results are illustrated in FIGS. 4A through 4G, the reduction/magnification resizing results may be further reduced as compared to FIG. 4A, and may be further magnified compared to FIG. 4G.

The resizing of the resizing unit 500 is based on a geometrical processing in which arrangements of pixel values are geometrically changed, i.e., coordinates on which pixels are located are changed without changing the pixel values. The geometrical processing is implemented by mapping coordinate values of original pixels to coordinate values of a target image. A process of moving pixel values of an original image by moving coordinates of the original image to coordinates of a target image is called "mapping". For example, the resizing unit 500 uses a forward mapping as an image resizing method. The forward mapping is used when moving pixel values from coordinates of an original image to coordinates of a target image. In other words, by using the forward mapping, coordinates of an extraction model pattern image (FIG. 4C) are mapped to coordinates of an image (FIGS. 4A, 4B, and 4D through 4G) to be resized. Referring to FIG. 5, a hole 501 may occur when magnification-resizing an image using the forward mapping, and an overlap 502 may occur when reduction-resizing an image using the forward mapping. The hole 501 occurs when pixels of an image to be magnification-resized are not mapped to pixels of an original image, and the overlap 502 occurs when pixels of an image to be reduction-resized are mapped to at least two pixels of an original image.

A reverse mapping may be used to remove the hole 501 and the overlap 502. However, in the current embodiment of the exemplary embodiments, the resizing is performed by using only the forward mapping without the reverse mapping. Thus, although a slight difference exists in the accuracy of object extraction, the amount of calculation decreases and a processing speed is faster.

However, the exemplary embodiments are not limited to the forward mapping. In other words, the reverse mapping may be used in the resizing method, and image interpolation such as nearest neighbor interpolation, bilinear interpolation, cubic convolution interpolation, etc., may also be used in the resizing method.

The object extraction unit 600 scans an image frame by using each reduction or magnification-resized extraction model pattern, and extracts an object that is matched with the resized extract model pattern.

Figure 4D:
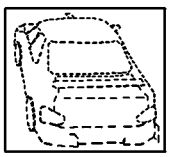
Figure 4E:
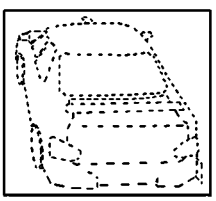
Figure 4F:
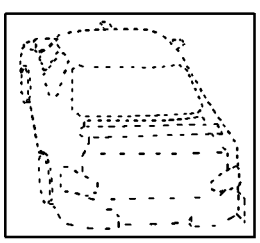
Figure 4G:
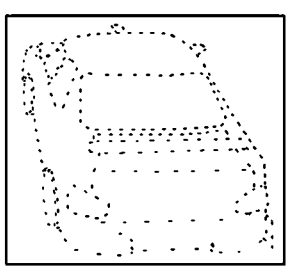
Figure 5:
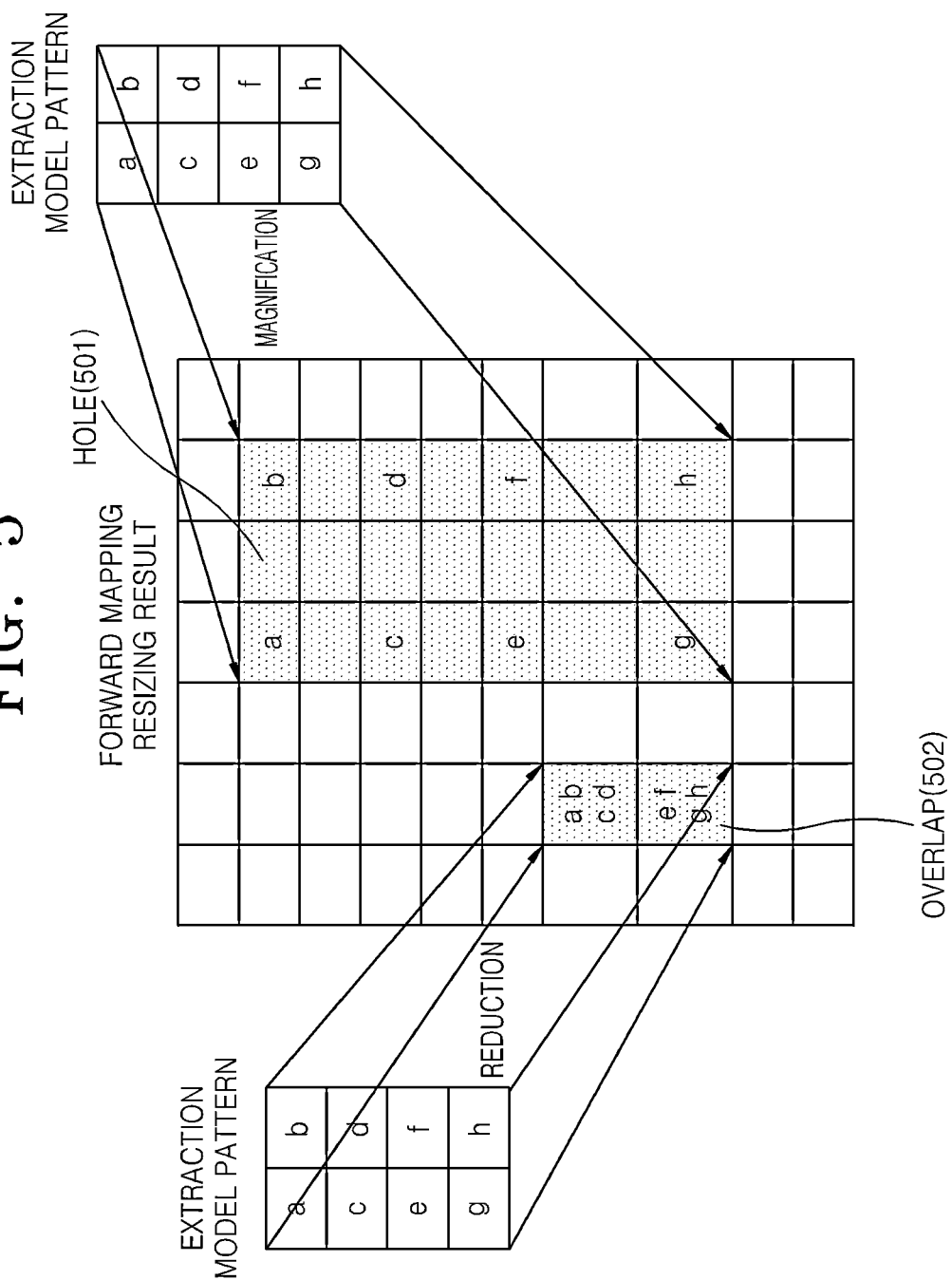
FIG. 5 is a diagram for explaining an image resizing using a forward mapping.
Figure 6A:
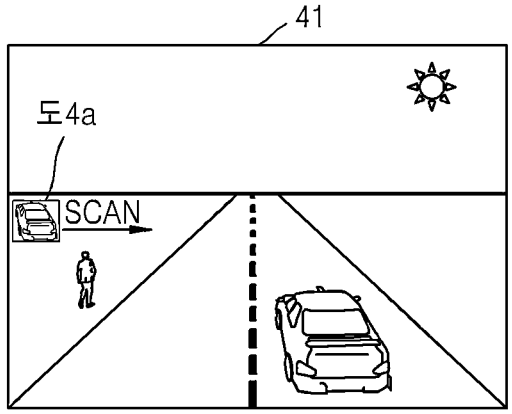
FIGS. 6A through 6F are diagrams illustrating processes in which an object extraction unit of FIG. 1 extracts an object by scanning an image frame by using each reduction or magnification-resized extraction model pattern.
Figure 6B:
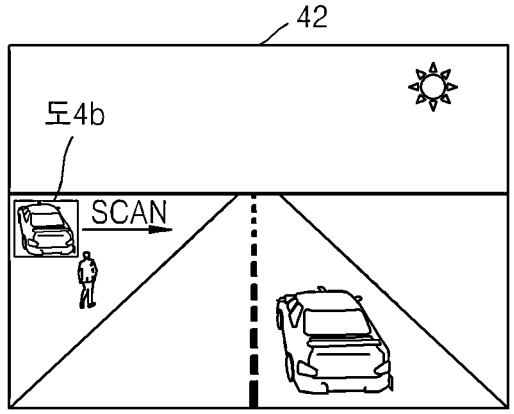
Figure 6C:
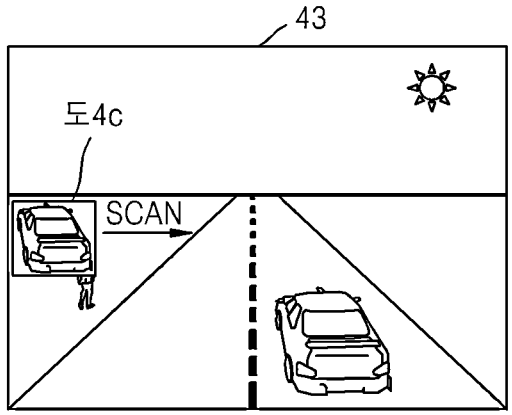
Figure 6D:
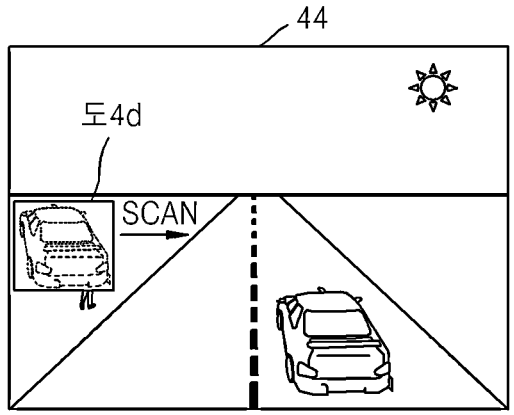
Figure 6E:
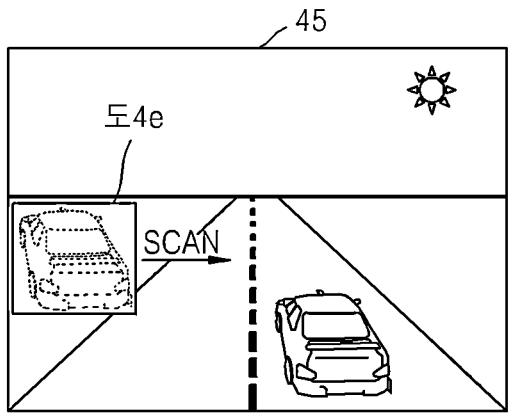
Figure 6F:
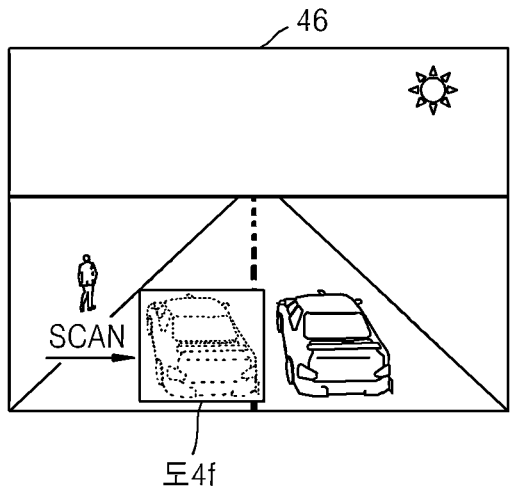

FIGS. 6A through 6F are diagrams illustrating processes in which the object extraction unit 600 extracts an object by scanning an image frame by using each reduction or magnification-resized extraction model pattern. When the car illustrated in FIG. 3 is set as an object to be extracted from the image frame of FIG. 3, FIG. 6A illustrates an example in which the image frame is scanned by using the reduction-resized extraction model pattern of FIG. 4A, FIG. 6B illustrates an example in which the image frame is scanned by using the reduction-resized extraction model pattern of FIG. 4B, FIG. 6C illustrates an example in which the image frame is scanned by using the basis extraction model pattern of FIG. 4C, FIG. 6D illustrates an example in which the image frame is scanned by using the magnification-resized extraction model pattern of FIG. 4D, FIG. 6E illustrates an example in which the image frame is scanned by using the magnification-resized extraction model pattern of FIG. 4E, and FIG. 6F illustrates an example in which the image frame is scanned by using the magnification-resized extraction model pattern of FIG. 4F. The object extraction unit 600 extracts an object that is matched with a resized extraction model pattern. As illustrated in FIG. 6F, it will be understood that an object matched with the magnification-resized extraction model pattern of FIG. 4F has been extracted as the result of the scanning of the image frame.

The display unit 700 displays information about the position of an extracted object in the current image frame.

In this case, the object extraction unit 600 transmits the information about the position of the object, displayed in the current image frame, and information about the resizing of an extraction model pattern, which is matched with the object, to a next image frame. Since information about the position of the object and information about the resizing of the extraction model pattern in a next image frame are not much different from those in the current frame, the object extraction unit 600 may estimate information about the position of the object and the size of a resized extract model pattern from the next image frame. Accordingly, the time which it takes to extract the object may be reduced.

In the current embodiment, various pieces of information about object model patterns are stored in the database 300, and the resizing unit 500 performs reduction or magnification resizing with respect to a set extraction model pattern. However, in another embodiment, reduction or magnification-resized results of each of object model patterns as well as various pieces of information about the object model patterns may be stored in the database 300 and an extraction model pattern may be set by a user. In this case, when an object is extracted by using the extraction model pattern set by the user and reduction or magnification-resized results of the extraction model pattern, the amount of calculation may be remarkably reduced. Thus, an object extraction speed may be improved.

Figure 7:
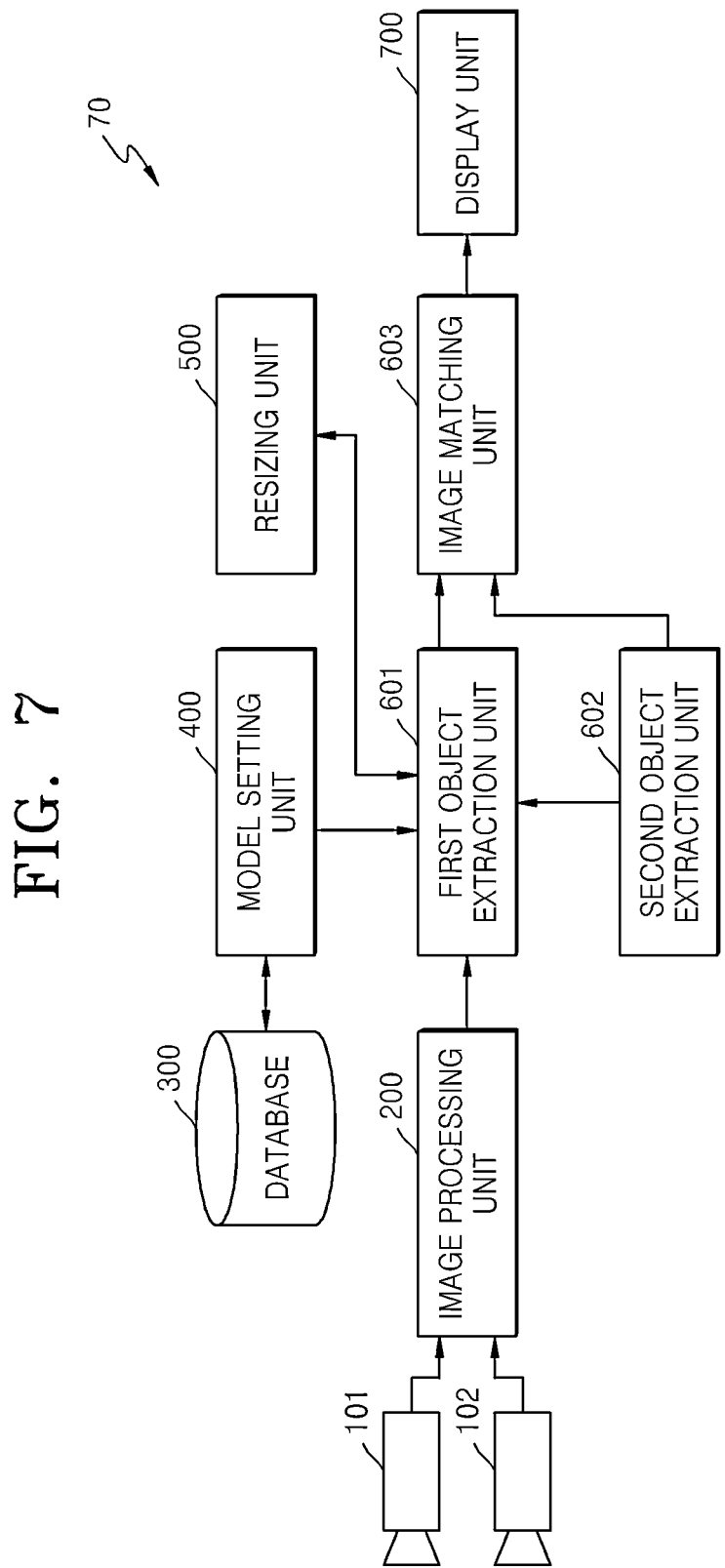
FIG. 7 is a block diagram schematically illustrating a structure of an object extracting apparatus according to another embodiment.

FIG. 7 is a block diagram schematically illustrating a structure of an object extracting apparatus 70 according to another embodiment of the exemplary embodiments. In the following description, redundant portions with the descriptions with reference to FIGS. 1 through 6 are omitted.

Referring to FIG. 7, the object extracting apparatus 70 according to another embodiment includes a first camera 101, a second camera 102, an image processing unit 200, a database 300, a model setting unit 400, a resize unit 500, a first object extracting unit 601, a second object extracting unit 602, an image matching unit 603, and a display unit 700. In comparison with FIG. 1 and FIG. 7, a 2-dimensional (2D) image is used in the object extracting apparatus 10 of FIG. 1, whereas a 3-dimensional (3D) image may be used in the object extracting apparatus 70 of FIG. 7.

The first camera 101 and the second camera 102 are left and right cameras that capture an object by using, for example, a complementary metal-oxide semiconductor (CMOS) module or a charge coupled device (CCD) module. First and second input image frames are provided to the CMOS module or CCD module via lenses. The CMOS module or CCD module of each of the first and second cameras 101 and 102 converts an optical signal, bouncing off the object and passing through the lenses, into an electric signal (a capturing signal), and outputs the electric signal to generate an image frame.

The image processing unit 200 performs image processing with respect to first and second image frames output from the first and second cameras 100 and 200. The structure and functions of the image processing unit 200 are the same as presented above with reference to FIGS. 1 to 6.

The database 300 stores various pieces of information about object model patterns. The model setting unit 400 sets an object model pattern of an object to be tracked, from among the various object model patterns stored in the database 300, as an extraction model pattern. For example, the model setting unit 400 may set a car model pattern represented by HOG as the extraction model pattern according to a user's selection.

The resizing unit 500 performs at least one resizing on the extraction model pattern set by the model setting unit 400. In particular, the resizing unit 500 performs reduction resizing and magnification resizing on the set extraction model pattern.

The first object extraction unit 601 scans a first image frame using each reduction or magnification-resized extraction model pattern, extracts a first object that is matched with the resized extract model pattern, and transmits information about the position of the first object and information about the resizing of the extraction model pattern to the second object extraction unit 602.

The second object extraction unit 602 extracts a second object by applying the information about the position of the first object and the information about the resizing of the extraction model pattern, extracted from the first image frame by the first object extraction unit 601, to the second image frame.

If the second object extraction unit 602 extracts the second object by using the same method as the first object extraction unit 601 extracts the first object, the first object extraction time and the second object extraction time, that is the same as the first object extraction time, are needed. However, since the second object extraction unit 602 extracts the second object by using the information about the position and pattern size of the first object from the first object extraction unit 601, the time for extracting the first object and the second object may be reduced.

The image matching unit 603 generates a 3D image by matching the first and second image frames with respect to areas where the first and second objects are extracted from. The image matching is a process of geometrically matching areas in physically similar images, in two or more different image frames acquired at angles different from each other.

The image matching unit 603 searches for a common area in the first image frame captured by the first camera 101 and the second image frame captured by the second camera 102, and obtains one image by matching two images based on the common area. In other words, for image matching, each of the first and second image frames is divided into a foreground area where the object exists and a background area that is the other area outside the foreground area, a common area of the background area of two image frames is searched for, and the two images are matched based on the common area. Detailed descriptions of the image matching are omitted.

Figure 8A:
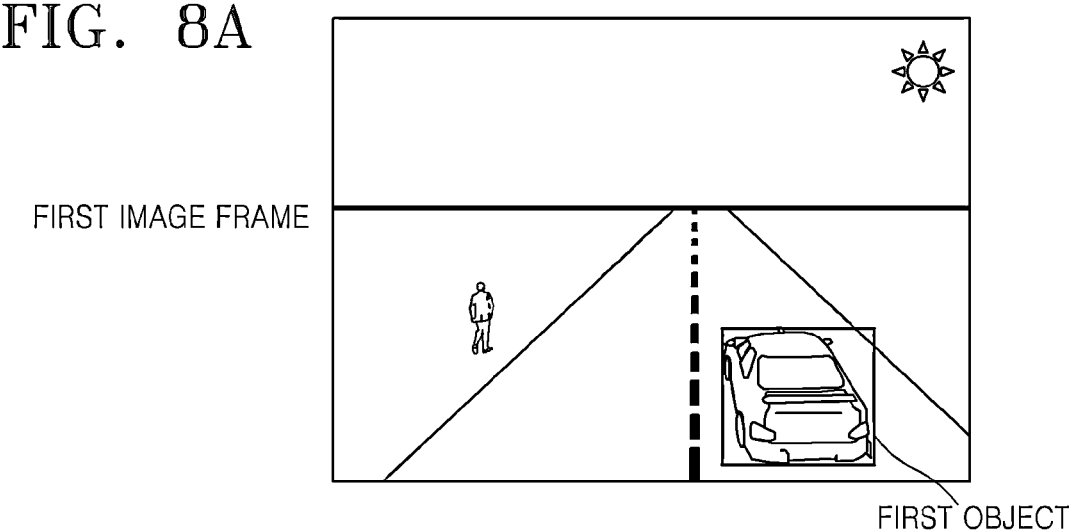
FIGS. 8A through 8C are diagrams schematically illustrating extraction and matching of an object in first and second image frames captured by first and second cameras of FIG. 7.
Figure 8B:
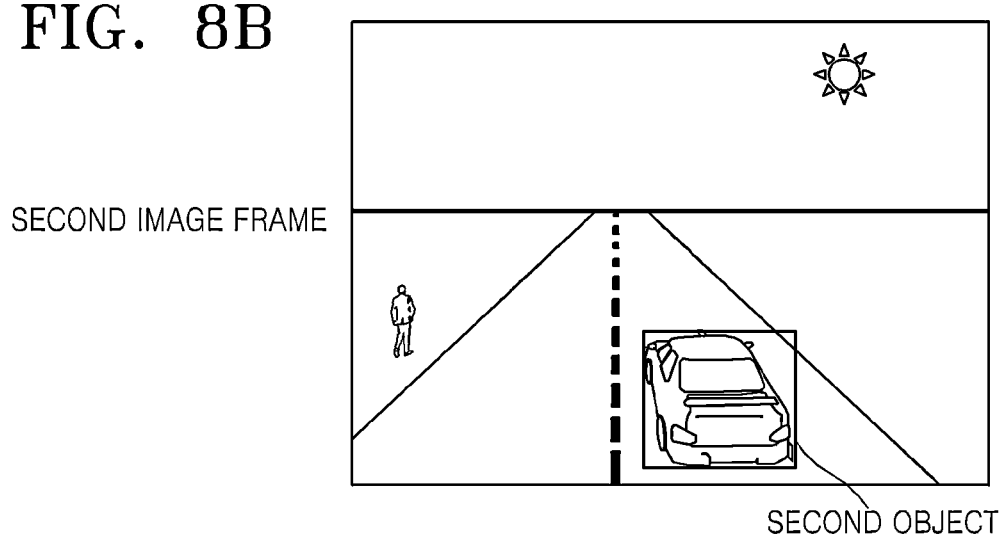
Figure 8C:
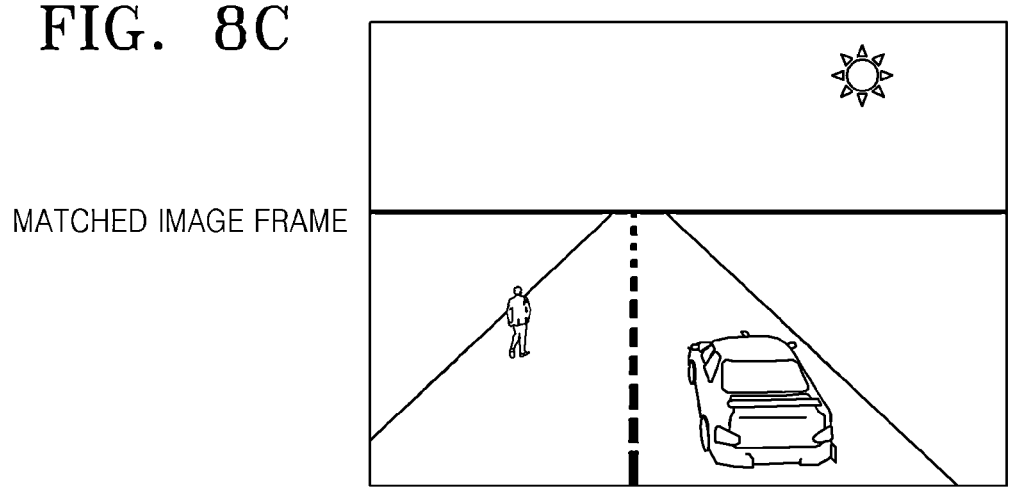

FIGS. 8A through 8C are diagrams schematically illustrating extraction and matching of an object in the first and second image frames captured by the first and second cameras 101 and 102 of FIG. 7. FIG. 8A illustrates a first object (e.g., a car) extracted from the first image frame. FIG. 8B illustrates a second object (e.g., a car) extracted from the second image frame by using information about the position of the first object extracted from the first image frame, and information about the resizing of an extraction model pattern. FIG. 8C illustrates a result obtained by matching the first image frame and the second image frame by using the image matching unit 603.

The display unit 700 displays the information about the position of an extracted object in a current matched image frame. The information about the position of the object, displayed by the display unit 700, is transferred as the information about the position of the object displayed in the current matched image frame and the information about the resizing of the extraction model pattern corresponding to the extracted object to a next first image frame. In order to reduce extraction and tracking time, information about the position of an object and information about the resizing of an extraction model pattern in the next image frame may be presumed from the information about the position of an object in the current image frame. Since the information about the position of an object is displayed in each of the input and matched image frames, the object may be extracted from a 3D image.

FIG. 9 is a flowchart illustrating a method of extracting an object with the object extracting apparatus 10, according to an embodiment of the exemplary embodiments. In the following description, redundant portions with the descriptions with reference to FIGS. 1 through 6 are omitted.

Referring to FIG. 9, the object extracting apparatus 10 selects an object model pattern of an object to be extracted, from among various object model patterns stored in the database 300, and sets the selected object model pattern as an extraction model pattern (S110). The setting of the extraction model pattern is not limited to the operation S110, and may be performed in any operation if the setting of the extraction model pattern is completed before an object is extracted from an image frame.

When the setting of the extraction model pattern is completed, the object extracting apparatus 10 performs an operation of obtaining an image frame captured by the camera 100 (S120). When the obtaining of the image frame is completed, the object extracting apparatus 10 performs an operation of reduction and magnification-resizing the set extraction model pattern (S130). The reduction and magnification-resizing of the set extraction model pattern is based on the forward mapping. However, the reverse mapping, or any one of various interpolation methods, may be used to perform the operation of reduction and magnification-resizing the set extraction model pattern.

When the reduction and magnification-resizing of the set extraction model pattern is completed, the object extracting apparatus 10 performs an operation of scanning an image frame by using each of resized extraction model patterns and extracting an object that is matched with any one of the resized extraction model patterns (S140).

When the extraction of the object is completed, the object extracting apparatus 10 performs an operation of displaying the information about the position of the extracted object in the current image frame (S150).

When the display of the information about the position of the object is completed, the object extracting apparatus 10 performs an operation of transferring the information about the position of the object displayed in the current image frame and the information about the resizing of an extraction model pattern corresponding to the extracted object to the next image frame, in order to extract the object from the next image frame (S160).

As the information about the position of the object is displayed in each input image frame, quick and accurate extracting of an object is possible.

FIG. 10 is a flowchart illustrating a method of extracting an object according to another embodiment of the exemplary embodiments. In the following description, redundant portions with the descriptions with reference to FIGS. 1 through 9 are omitted.

Referring to FIG. 10, the object extracting apparatus 70, according to the above embodiment, selects an object model pattern of an object to be extracted, from among various object model patterns stored in the database 300, and sets the selected object model pattern as an extraction model pattern (S210). The setting of the extraction model pattern is not limited to the operation S210, and may be performed in any operation if the setting of the extraction model pattern is completed before an object is extracted from an image frame.

When the setting of the extraction model pattern is completed, the object extracting apparatus 70 performs an operation of obtaining first and second image frames captured by the first and second cameras 101 and 102, respectively (S220).

When the obtaining of the first and second image frames is completed, the object extracting apparatus 70 performs an operation of reduction and magnification-resizing the set extraction model pattern (S230). The reduction and magnification-resizing of the set extraction model pattern is based on the forward mapping. However, the reverse mapping, or any one of various interpolation methods, may be used to perform the operation of reduction and magnification-resizing the set extraction model pattern.

When the reduction and magnification-resizing of the set extraction model pattern is completed, the object extracting apparatus 70 performs an operation of scanning the first image frame by using each of the resized extraction model patterns and extracting a first object that is matched with any one of the resized extraction model patterns (S240).

When the extracting of the first object is completed, the object extracting apparatus 70 performs an operation of extracting a second object by applying information about the position of the first object extracted from the first image frame and information about the resizing of an extraction model pattern to the second image frame (S250). Since the second object is extracted by using the information about the position of the first object and the information about the resizing of the extraction model pattern, the time to extract the second object may be reduced.

When the extracting of the second object is completed, the object extracting apparatus 70 performs an operation of generating a 3D image by matching the first and second image frames with respect to areas where the first and second objects are extracted from (S260).

When the matching of the first and second images is completed, the object extracting apparatus 70 performs an operation of displaying the information about the position of the extracted object in the matched image frame (S270).

When the displaying of the information about the position of the object is completed, the object extracting apparatus 70 performs an operation of storing the information about the position of the extracted object and the information about the resizing of an extraction model pattern displayed in the matched current image in the database 300, and transferring the information to the next first image frame when the first camera 101 captures the next first image frame.

As the information about the position of the object is displayed in each input and the image frames are matched, quick and accurate tracking of an object is possible for a 3D image.

The exemplary embodiments can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the exemplary embodiments can be easily construed by programmers skilled in the art to which the exemplary embodiments pertain.

According to the exemplary embodiments, the image processing unit 200, the model setting unit 400, the resizing unit 500, the object extraction unit 600, and the display unit 700 may each include at least one processor. In an alternative embodiment, at least one processor may perform all of the functions of the image processing unit 200, the model setting unit 400, the resizing unit 500, the object extraction unit 600, and the display unit 700. Finally, according to the exemplary embodiments, at least one of the image processing unit 200, the model setting unit 400, the resizing unit 500, the object extraction unit 600, and the display unit 700 may include a circuit or a device for performing their respective functions.

While the exemplary embodiments has been particularly shown, it will be understood by those skilled in the art that various changes in form and details may be made therein without departing from the spirit and scope of the exemplary embodiments as defined by the appended claims.

What is claimed is:

1. A method of extracting an object, the method comprising:
    performing, by a resizing device, at least one resizing on an extraction model pattern for the object to be extracted to obtain at least two or more extraction model patterns having different sizes;
    scanning, by an object extraction device, a current image frame, captured by a camera, using each of the at least two or more extraction model patterns, and extracting the object that is matched with any one of the at least two or more extraction model patterns;

displaying, by a display, information about a position of the extracted object;

selecting an object model pattern of the object to be extracted, from among various object model patterns stored in a database, the various object model patterns respectively corresponding to different feature vectors according to types of the object, the different feature vectors being extracted by using a histogram of gradient (HOG) algorithm, and setting the selected object model pattern as the extraction model pattern.

2. The method of claim 1, wherein the performing the at least one resizing comprises performing at least one of reduction resizing and magnification resizing on the extraction model pattern.

3. The method of claim 1, wherein the performing the at least one resizing comprises performing a forward mapping in which coordinates of an image of the extraction model pattern are mapped to coordinates of a target image of the resizing, and wherein the performing the forward mapping comprises:
obtaining basis information of the extraction model pattern, the basis information being stored in a database; and
performing the forward mapping in which coordinates of an image of the basis information of the extraction model pattern are mapped to coordinates of the target image of the resizing.

4. The method of claim 1, further comprising transferring the information about the position of the extracted object and information about the any one of the at least two or more extraction model patterns, which is matched with the object, to a next image frame.

5. The method of claim 1, further comprising:
performing at least one resizing on the various object model patterns stored in the database; and
storing at least one resized object model pattern for each of the various object model patterns in the database.

6. The method of claim 5, wherein the extracting the object comprises:
scanning the current image frame using each of the at least one resized extraction model pattern for the selected object model pattern stored in the database, and extracting the object that is matched with any one of the at least one resized extraction model pattern for the selected object model pattern.

7. The method of claim 1, wherein the scanning the image frame comprises:
obtaining a first image frame captured by a first camera; and
obtaining a second image frame captured by a second camera.

8. The method of claim 7, wherein the performing the at least one resizing comprises performing at least one resizing on an extraction model pattern for the object to be extracted in a first image frame to obtain at least two or more extraction model patterns having different sizes.

9. The method of claim 8, wherein the extracting the object comprises:
scanning the first image frame using each of the at least two or more extraction model patterns, and extracting a first object that is matched with any one of the at least two or more extraction model patterns; and
extracting a second object by applying the information about the position of the first object extracted from the first image frame and information about the any one of the at least two or more extraction model patterns to the second image frame.

10. The method of claim 9, further comprising matching the first and second image frames with respect to extracted areas of the first object and the second object.

11. The method of claim 10, wherein the displaying the information about the position comprises displaying the information about the position of the object in a matched image frame.

12. An apparatus for extracting an object, comprising:
a resizing device which performs at least one resizing on an extraction model pattern of the object to be extracted to obtain at least two or more extraction model patterns having different sizes;
an object extraction device which scans a current image frame, captured by a camera, using each of the at least two or more extraction model patterns, and extracts the object which is matched with any one of the at least two or more extraction model patterns;
a display device which displays information about a position of the extracted object in the image frame; and
a model setting device which selects an object model pattern of the object to be extracted, from among various object model patterns stored in a database, the various object model patterns respectively corresponding to different feature vectors according to types of the object, the different feature vectors being extracted by using a histogram of gradient (HOG) algorithm, and sets the selected object model pattern as the extraction model pattern.

13. The apparatus of claim 12, wherein the resizing device performs at least one of reduction resizing and magnification resizing on the extraction model pattern, and performs a forward mapping in which coordinates of an image of basis information of the extraction model pattern are mapped to coordinates of a target image of the at least one of the reduction resizing and the magnification resizing, the basis information being stored in a database.

14. The apparatus of claim 12, wherein the object extraction device applies the information about the position of the extracted object and information about the any one of the at least two or more extraction model patterns, which is matched with the object, to a next image frame.

15. An apparatus for extracting an object, comprising:
a first camera which obtains a first image frame;
a second camera which obtains a second image frame;
a model setting device which selects an object model pattern of the object to be extracted, from among various object model patterns stored in a database, the various object model patterns respectively corresponding to different feature vectors according to types of the object, the different feature vectors being extracted by using a histogram of gradient (HOG) algorithm, and sets the selected object model pattern as the extraction model pattern;
a resizing device which performs at least one resizing on the set extraction model pattern to obtain at least two or more extraction model patterns having different sizes;
an object extraction device which scans the first image frame using each of the at least two or more extraction model patterns, extracts a first object that is matched with any one of the at least two or more extraction model patterns, and extracts a second object by applying information about the position of the first object extracted from the first image frame and information about the any one of the at least two or more extraction model patterns to the second image frame;

a matching device which matches the first and second image frames with respect to extracted areas of the first object and the second object; and a display device which displays the information about a position of the object in a matched image frame.

16. The apparatus of claim 15, wherein the resizing device performs at least one of reduction resizing and magnification resizing on the extraction model pattern and performs a forward mapping in which coordinates of an image of basis information of the extraction model pattern are mapped to coordinates of a target image of the at least one of the reduction resizing and the magnification resizing, the basis information being stored in a database.

17. The apparatus of claim 15, wherein the object extraction device applies the information about the position of the extracted object and information about the any one of the at least two or more extraction model patterns, which is matched with the object, to a next first image frame captured by the first camera.

18. A non-transitory computer readable recording medium having recorded thereon a program for executing a method of extracting an object, the method comprising:

obtaining an image frame captured by a camera;

performing at least one resizing on an extraction model pattern for extracting an object in the image frame to obtain at least two or more extraction model patterns having different sizes;

scanning the same image frame using each of the at least two or more extraction model patterns, and extracting the object that is matched with any one of the at least two or more extraction model patterns;

displaying information about a position of the extracted object;

selecting an object model pattern of the object to be extracted, from among various object model patterns stored in a database, the various object model patterns respectively corresponding to different feature vectors according to types of the object, the different feature vectors being extracted by using a histogram of gradient (HOG) algorithm, and setting the selected object model pattern as the extraction model pattern.

* * * * *